United States Patent [19]

Tokuyama et al.

[11] Patent Number: 4,635,034

[45] Date of Patent: Jan. 6, 1987

[54] DISPLAY APPARATUS FOR VEHICLE

[75] Inventors: Keiichi Tokuyama; Shotaro Naito; Mitsuhiro Masuda, all of Katsuta, Japan

[73] Assignee: Hitachi, Ltd., Tokyo, Japan

[21] Appl. No.: 493,501

[22] Filed: May 11, 1983

[30] Foreign Application Priority Data

May 12, 1982 [JP] Japan .................................. 57-78383

[51] Int. Cl.$^4$ ............................................ B60Q 1/00
[52] U.S. Cl. ................................. 340/52 F; 340/52 R
[58] Field of Search ................. 364/424, 565; 377/24; 340/62, 52 R, 52 F

[56] References Cited

U.S. PATENT DOCUMENTS

| | | | |
|---|---|---|---|
| 4,195,348 | 3/1980 | Kakutani | 377/24 |
| 4,371,934 | 2/1983 | Wahl et al. | 364/444 |
| 4,371,935 | 2/1983 | Yamaki | 364/424 |
| 4,494,404 | 1/1985 | Strifley | 340/52 R |

Primary Examiner—John W. Caldwell, Sr.
Assistant Examiner—Tyrone Queen
Attorney, Agent, or Firm—Antonelli, Terry & Wands

[57] ABSTRACT

A display apparatus for a vehicle comprising arithmetic unit for processing outputs of different sensors in accordance with a given process program so as to provide display signals adapted to be displayed on different display units, a memory for storing predetermined process programs corresponding to different display standards, and a program selecting device for selecting one of the process programs stored in the memory in accordance with a desired one of the display standards and supplying the selected process program to the arithmetic unit, whereby the display units can display signals to meet any one of the different display standards.

4 Claims, 4 Drawing Figures

DISPLAY APPARATUS FOR VEHICLE

This invention relates to a display apparatus for vehicles, and particularly to a display apparatus for vehicle applicable to any one of different display standards.

Vehicles such as automobiles have display units provided to display the number of revolutions of engine, remaining amount of fuel, driving speed engine temperature and so on. Particularly in displaying the driving speed thereof, the standards for displayed speed unit, e.g., displayed speed vs. actual speed characteristic as well as standards for, maximum displayed speed, alarm giving speed and so on are sometimes different depending on countries using vehicles. Therefore, vehicles must be provided with display units, e.g., speedometers, to meet the standard of the country importing the vehicles. This requires many types of display units to meet different standards for various countries importing vehicles, and this makes management of parts complicated and increases the cost of vehicle.

Accordingly, it is an object of this invention to provide a display apparatus for a vehicle capable of being readily modified to meet any one of various different standards by a simple switching device.

According to this invention, there is provided a display apparatus for vehicle which comprises an arithmetic unit for processing the outputs of different sensors in accordance with given process programs to provide display signals adapted to be displayed on display units provided in the vehicle, a memory for storing process programs corresponding to predetermined different standards, and program selecting means for selecting one of the process programs stored in the memory and supplying the selected process program to the arithmetic unit.

The features and advantages of the present invention will be more clearly understood from the following description of embodiments of the present invention with reference to the accompanying drawings in which.

Figure 1:
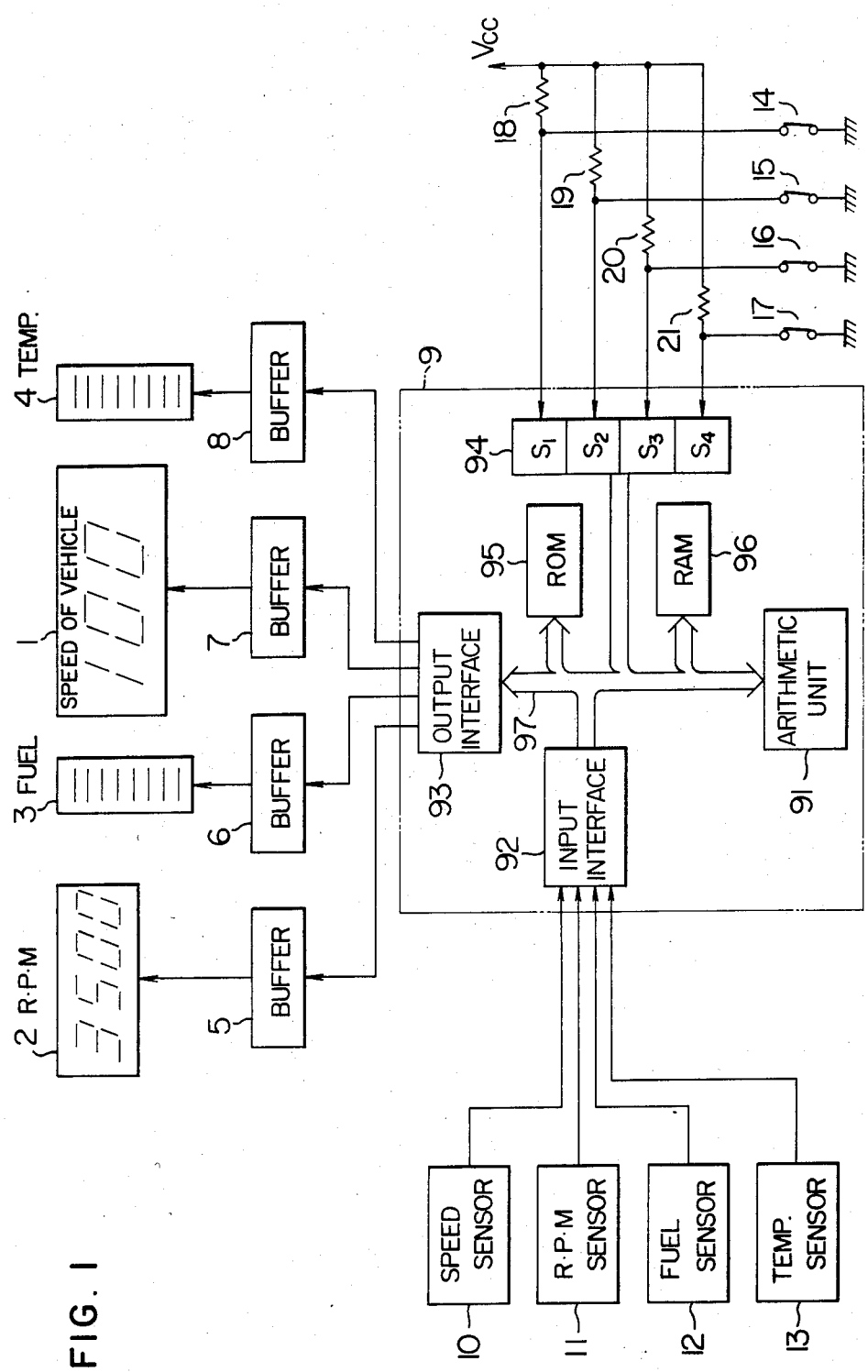
FIG. 1 is a circuit block diagram of a display apparatus according to this invention.
Figure 2:
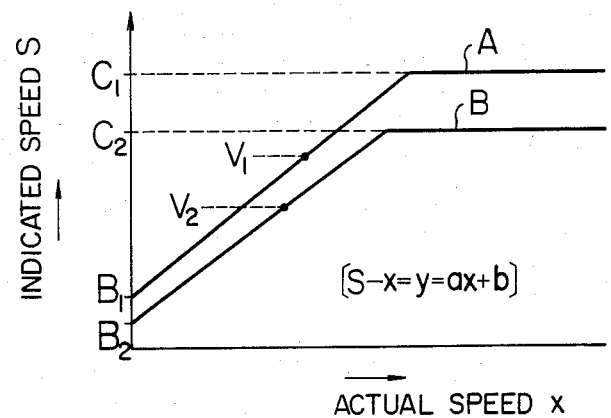
FIG. 2 is a graph showing the relation of displayed speed to actual speed of vehicle.

An embodiment of a digital display apparatus for vehicles according to this invention will be described with reference to FIG. 1. In FIG. 1, display units 1, 2, 3 and 4 display the speed of vehicle, the number of revolutions of engine per unit time, the amount of remaining fuel, and the temperature of engine, respectively. The signals to be displayed on these display units are produced by a processor 9 such as a microcomputer from the output signals derived from a vehicle speed sensor 10, engine-rotation rate sensor 11, fuel sensor 12, and engine temperature sensor 13 which are provided in a vehicle. The signals from the processor 9 are respectively supplied via buffers 5, 6, 7 and 8 to the display units 1, 2, 3 and 4, where they are displayed. Since the standards for displaying the revolution rate of engine, amount of remaining fuel, and temperature of engine are generally not different depending on countries importing vehicles common programs can be used in any country for making the signals for those displays. The standard for displaying vehicle speed, however, is often different depending on countries. For example, in FIG. 2 showing the relation of the actual speed x and displayed speed S of vehicle, the standard in country A is represented by a characteristic curve A and the standard in country B is represented by a curve B. In general, the displayed speed S of vehicle is slightly higher than the actual speed x of vehicle and the difference y therebetween is a function of the actual speed x. If for example, the characteristic A is given by $$S = x + y = a_1 x + b_1, \text{ for } S \leq C_1 \\ S = C_1, \text{ for } S > C_1 \quad \quad (1)$$

and the characteristic B is given by $$S = x + y = a_2 x + b_2, \text{ for } S \leq C_2 \\ S = C_2, \text{ for } S > C_2 \quad \quad (2)$$

when in order to meet the standard of country A, the value of S must be determined to satisfy the relation of Eq. (1) with respect to the actual speed x of vehicle, while in order to meet the standard of country B, the value of S must be determined to satisfy the relation of Eq. (2). Moreover, the displayed speed v at which a visual or audible alarm is given, may be different as $v_1$ in country A and $v_2$ in country B. Thus, different programs must be executed by the processor 9 depending on countries for calculating the displayed speed S from the actual speed x of vehicle. In this embodiment, therefore, various different processing programs are preliminarily stored in a ROM 95 and a desired program is selected from the ROM in response to a program selecting signal supplied from program specifying means. The program specifying means includes an index register of 4 bits $S_1$, $S_2$, $S_3$ and $S_4$, input circuits 18, 19, 20 and 21 capable of independently setting each of the four bits $S_1$, $S_2$, $S_3$ and $S_4$ in the index register 94, and switches 14, 15, 16 and 17 for setting the output of these input circuits 18, 19, 20 and 21 to high level "1" or low level "0". Each of the switches 14, 15, 16 and 17, when opened, makes the output level of the corresponding input circuit at high level "1", and each, when closed, makes it at low level "0". In the illustrated condition, the switch 14 is opened and the other switches 15, 16 and 17 are closed. Therefore, the register 94 in the processor 9 is set to 1000. Although the four-bit register 94 can provide any one of 16 different codes, and hence any desired one of 16 different programs based on different standards can be selected, it is assumed for simplicity that the ROM 95 stores four programs for processes A, B, C and D corresponding to 1000, 0100, 0010 and 0001, in the register 94. Since it is almost unnecessary to readjust the display unit after it has been adjusted to meet the standard of a given country where the vehicle is to be imported, jumper wires or the like may be used, in place of the switches, to set the output level of each circuit according to the standard of the importing country.

The outputs of the sensors 10, 11, 12 and 13 are converted by an input interface 92 to suitable signal forms to be processed by the processor 9. A process program corresponding to the contents of the register 94 set by the specifying means is selected from the ROM, and the signals from the sensors 10, 11, 12 and 13 are processed by an arithmetic unit 91 in accordance with the selected program, to produce various display signals to be displayed on the display units. The display signals are further converted by an output interface 93 to appropriate signal forms to be displayed on the respective display units, and then stored in the buffers 5, 6, 7 and 8, the outputs of which are applied to the display units 2, 3, 1 and 4, respectively. These operations constitute one processing cycle. The contents of the buffers 5, 6, 7 and 8 are kept until the next processing cycle is executed and new display signals are obtained. One processing cycle is usually about 0.5 sec.

Figure 3:
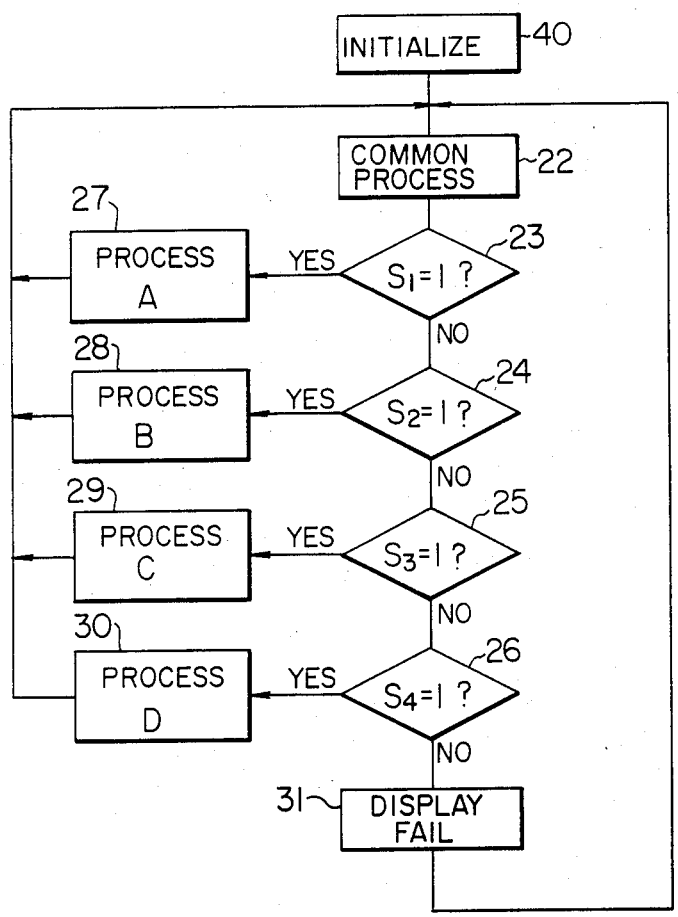
FIGS. 3 and 4 are flow charts of a process carried out by the arithmetic unit.
Figure 4:
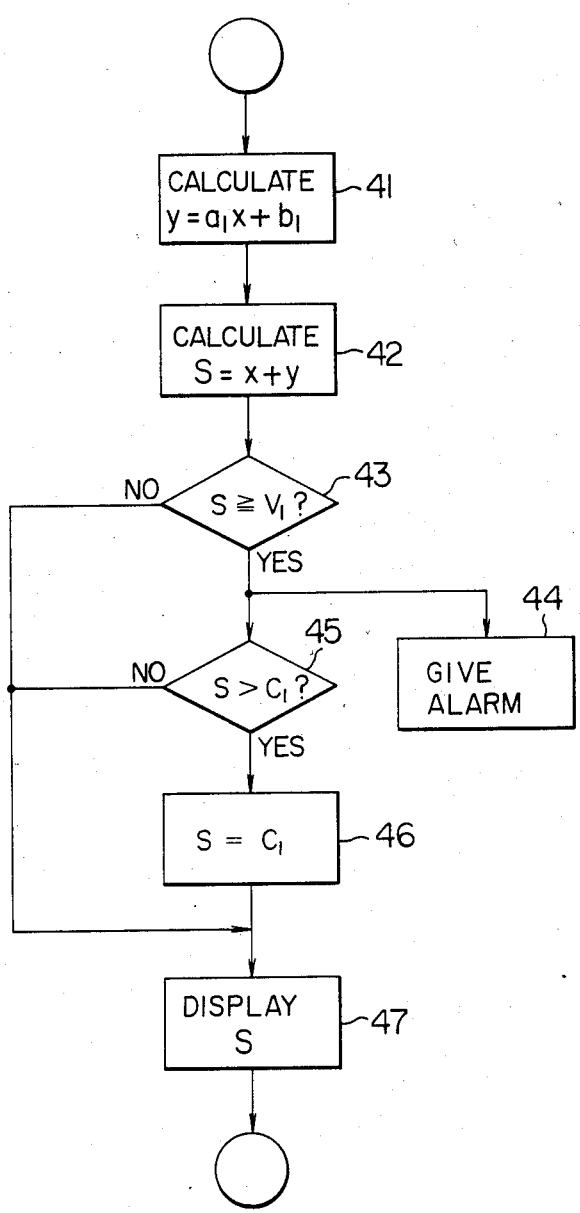

FIGS. 3 and 4 are flow charts for the above process. In FIG. 3, the step 40 is for setting each part of the microcomputer 9 to the initial conditions when power is turned on. At step 22, the outputs from sensors of specific parameters such as the number of engine rotations, amount of remaining fuel and engine temperature for which the common display standards can be used in any country are processed to produce corresponding display signals. At steps 23, 24, 25 and 26, decision is made of whether each of the bits $S_1$, $S_2$, $S_3$ and $S_4$ of the register 94 is "1" or not. If, for example, the bits $S_1$, $S_2$, $S_3$ and $S_4$ of the register 94, are 1000, the program goes to step 27 where process-A program is read from the ROM 95 and then executed. In this embodiment, from process programs A, B, C and D are stored and designated by codes 1000, 0100, 0010 and 0001, respectively. Therefore only the steps 23, 24, 25 and 26 are provided to select one of the four process programs. If more than four process programs are necessary, the number of selection steps is correspondingly increased in a well known manner.

If the decisions at steps 23, 24, 25 and 26 are all NO, one of bits $S_1$, $S_2$, $S_3$ and $S_4$ may be error and thus the program goes back to the step 22, for repeating the same operation. If the error is temporary, normal state will be restored when the operation is repeated two or three times. However, if normal state is not restored even after lapse of much time and a fail display 31 is not turned off, it is necessary to check the circuitry. The process-A program is, for example, shown by the flow chart of FIG. 4. At step 41, the difference y between the display speed S and the actual speed x of vehicle is calculated from an equation $y = a_1 x + b_1$ where $a_1$ and $b_1$ are coefficients predetermined according to the standard of country A. At step 42, the display speed $S = x + y$ is calculated, and at step 43, decision is made of whether the display speed S is lower than a predetermined speed $v_1$ or not. If the display speed S is lower than $v_1$, the program goes to a step 47 which allows the value S to be used as the display signal. If the speed S is equal to or higher than $v_1$, the program goes to step 44 where an alarm of abnormally high speed is given visually or audibly, and also to step 45 where decision is made of whether the speed S is higher than the maximum display speed $C_1$. If the speed S is not higher than $C_1$, the program is progressed to step 47 which allows the speed S to be used as the display signal. If the speed S is higher than $C_1$, the program is progressed to step 46 where the value of S is replaced by $C_1$ and then the step 47 is executed.

In the above embodiment, the process-A, -B, -C and -D programs are prepared for the standards of countries A, B, C and D and stored in the ROM so that any desired program can be read out of the ROM according to the contents of the register 94. However, it is possible to arrange such that a single program common to all the processes and the respective values of the coefficients a, b, c and v corresponding to the processes A, B, C and D are stored in the ROM and, when the process to be executed is specified, the coefficients a, b, c and v of the common program are replaced by selected values read out of the ROM according to the specified process.

In addition, while the four switches are used to select one of four codes 1000, 0100, 0010 and 0001 corresponding to processes A, B, C and D, the four switches can be used to select one of sixteen different processes designated by sixteen different codes of four bits, respectively. If only four processes are sufficient to meet any standard, it is possible to use a code of two bits, i.e. 00, 01, 10, or 11 indicative of the four processes, respectively and select one of the processes by using two switches.

The display apparatus of this invention is capable of meeting any of different display standards in various countries by simply setting the index register to a code corresponding to the desired standard and thus the apparatus, e.g., a speedometer of the same type can be produced for different standards unlike the prior art in which different types of speedometers must be produced to meet different standards of various countries. This feature of this invention contributes to simple management of parts. Moreover, the processor in this invention may be a one-chip microcomputer and therefore it contributes to making mass production effective and to low cost of vehicle.

We claim:

1. A display apparatus for a vehicle comprising:
   display means for displaying a value of a parameter relating to an operation condition of the vehicle in a predetermined unit of measurement of the parameter which is speed of the vehicle;
   sensor means for detecting the parameter and producing a first signal representing an actual value of the parameter in the predetermined unit of measurement;
   storage means for storing a plurality of programs, each program enabling processing of the first signal to produce a second signal representing a displaying value of the parameter in the predetermined unit of measurement by which the parameter is displayed by said display means, said programs being previously prepared based on, respectively, predetermined different relationships between the actual value of the parameter in the predetermined unit of measurement and the displaying value of the parameter in the predetermined unit of measurement;
   means for selecting one of said programs;
   arithmetic means receiving the first signal for processing the first signal according to the selected one of said programs so as to produce the second signal representing the displaying value in accordance with the predetermined relationship between the actual value and the displaying value corresponding to the one selected program; and
   means for applying the second signal produced by said arithmetic means to said display means for enabling display of the displaying value of the parameter in the predetermined unit of measurement.

2. A display apparatus according to claim 1, wherein the display means is a speedometer.

3. A display apparatus according to claim 1, wherein said means for selecting one of said programs includes a register, said register being externally selectively setable to any one of a plurality of predetermined binary codes corresponding to said different predetermined relationships between the actual value and the displaying value of the parameter.

4. A display apparatus according to claim 2, wherein said means for selecting one of said programs includes a register, said register being externally selectively setable to any one of a plurality of predetermined binary codes corresponding to said different predetermined relationships between the actual value and the displaying value of the parameter.

* * * * *